(12) United States Patent
Detwiler et al.

(10) Patent No.: US 11,588,821 B1
(45) Date of Patent: Feb. 21, 2023

(54) SYSTEMS AND METHODS FOR ACCESS CONTROL LIST (ACL) FILTERING

(71) Applicant: ADTRAN, Inc., Huntsville, AL (US)

(72) Inventors: Thomas Frederick Detwiler, Huntsville, AL (US); Cory Z. Zywno, Huntsville, AL (US); Darrin L. Gieger, Pell City, AL (US); Spencer R. Gass, Madison, AL (US); Miriam Angela Nunnally, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 272 days.

(21) Appl. No.: 16/818,431

(22) Filed: Mar. 13, 2020

(51) Int. Cl.
*H04L 9/40* (2022.01)
*G06F 16/22* (2019.01)

(52) U.S. Cl.
CPC ........ *H04L 63/101* (2013.01); *G06F 16/2282* (2019.01)

(58) Field of Classification Search
None
See application file for complete search history.

(56) References Cited

U.S. PATENT DOCUMENTS

| | | | |
|---|---|---|---|
| 2005/0076138 A1 | 4/2005 | Sterne | |
| 2005/0114657 A1 | 5/2005 | Kumar et al. | |
| 2007/0150614 A1 | 6/2007 | Ramachandran et al. | |
| 2009/0125470 A1 | 5/2009 | Shah et al. | |
| 2018/0054397 A1 | 2/2018 | Nanda et al. | |
| 2020/0007547 A1 | 1/2020 | Valiquette et al. | |
| 2020/0067851 A1 | 2/2020 | Yigit et al. | |

*Primary Examiner* — Hong Shao
(74) *Attorney, Agent, or Firm* — Maynard Cooper & Gale, P. C.; Jon E. Holland (57) ABSTRACT

A filter for performing access control list (ACL) filtering may be used in place of highly-complex and resource-intensive TCAMs for access control. In this regard, the filter may be configured to compare packet header information to action-priority pairs stored in ACL tables. Each action-priority pair indicates at least one action to be performed for implementing a desired rule and a priority for that action. An access control action from an action-priority pair matching the header information may be performed in order to implement a desired access control rule for the received packet. If multiple action-priority pairs from the same table match the header information, then the priorities of the matching action-priority pairs may be compared to resolve the conflict. The circuitry of the filter is arranged such that exact-match searching can be performed on the ACL tables to reduce the complexity and cost of the filter.

11 Claims, 6 Drawing Sheets

SYSTEMS AND METHODS FOR ACCESS CONTROL LIST (ACL) FILTERING

RELATED ART

Network communication is often filtered or controlled using a set of rules, for example, access control lists (ACLs), also sometimes referred to as "subscriber management filters (SMFs)," to help control traffic and, in particular, reduce malicious, undesirable, or otherwise inappropriate packets. These rules generally help control subscriber access to a network and are often implemented by a network access device at the edge of the network.

These access control rules have often been implemented through ternary content-addressable-memory (TCAM). TCAMs are useful for their ability to ignore irrelevant bits, sometimes referred to as "don't cares," when selecting rules to be applied. In this regard, TCAMs generally work by accepting a series of input bits and matching them against the contents of memory cells storing 0s, 1s, and Xs ("don't care" mask bits). This can be used to encode rules by specifying the input values relevant to the selection of a particular rule and ignoring the "don't care" values that are irrelevant to the selection of the rule. These content value entries may be associated with priority indicators in the TCAM. When multiple rules match a given input, the priority indicators may be used to prioritize the rules such that a rule of higher priority is matched to the input over a rule of lower priority. TCAMs provide excellent speed and wildcarding capabilities but are expensive and highly-complex, and they consume substantial resources and consume a significant amount of power. Additionally as input sizes increase, the complexity and size of a TCAM can dramatically increase. Lower complex and inexpensive circuitry for providing access control similar to TCAMs are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for access control list (ACL) filtering. The systems and methods presented herein enable low-complexity ACL filtering similar to ACL filters implemented using highly-complex and resource-intensive TCAMs. Notably, the circuitry of the filter is arranged such that exact-match searching can be used instead of TCAMs to reduce the complexity and cost of the filter. In some embodiments, the low-complexity ACL filter using exact-match searches may entirely replace a conventional ACL filter implemented using TCAMs. In this regard, the filter may be configured to receive a data packet and compare header information to action-priority pairs stored in a plurality of ACL tables. Each action-priority pair indicates at least one access control action to be performed for implementing a desired rule and a priority for that action. An access control action from an action-priority pair matching the header information may be performed in order to implement a desired access control rule for the received packet. If multiple action-priority pairs match the header information, then the priority indicators of the matching action-priority pairs may be compared to resolve the conflict, such as by selecting the highest priority action-priority pair.

In some embodiments, when the filter receives a data packet during operation, the filter is configured to parse the packet header into header fields. The filter is also configured to determine a filter group identifier from one or more of the header fields and select a plurality of ACL tables that are associated with the filter group identifier. Based on the filter group identifier, the filter is further configured to compress one or more of the header fields into a series of range identifiers that are used to form search strings for the selected ACL tables. In this regard, for each ACL table, an op code (e.g., a bit mask) correlated with the ACL table is applied to the compressed range identifiers to provide a search string that can be used to search the ACL table for matching action-priority pairs. As described above, a matching action-priority pair from the ACL tables may be used to implement an access control rule for the received data packet, as may be desired.

Note that the compression of the header fields and application of the op code remove "don't care" bits in the search string so that the ACL tables can be searched using exact matching. The circuitry used to perform the searches of the ACL tables may be significantly less complex and expensive relative to conventional TCAMs.

Figure 1:
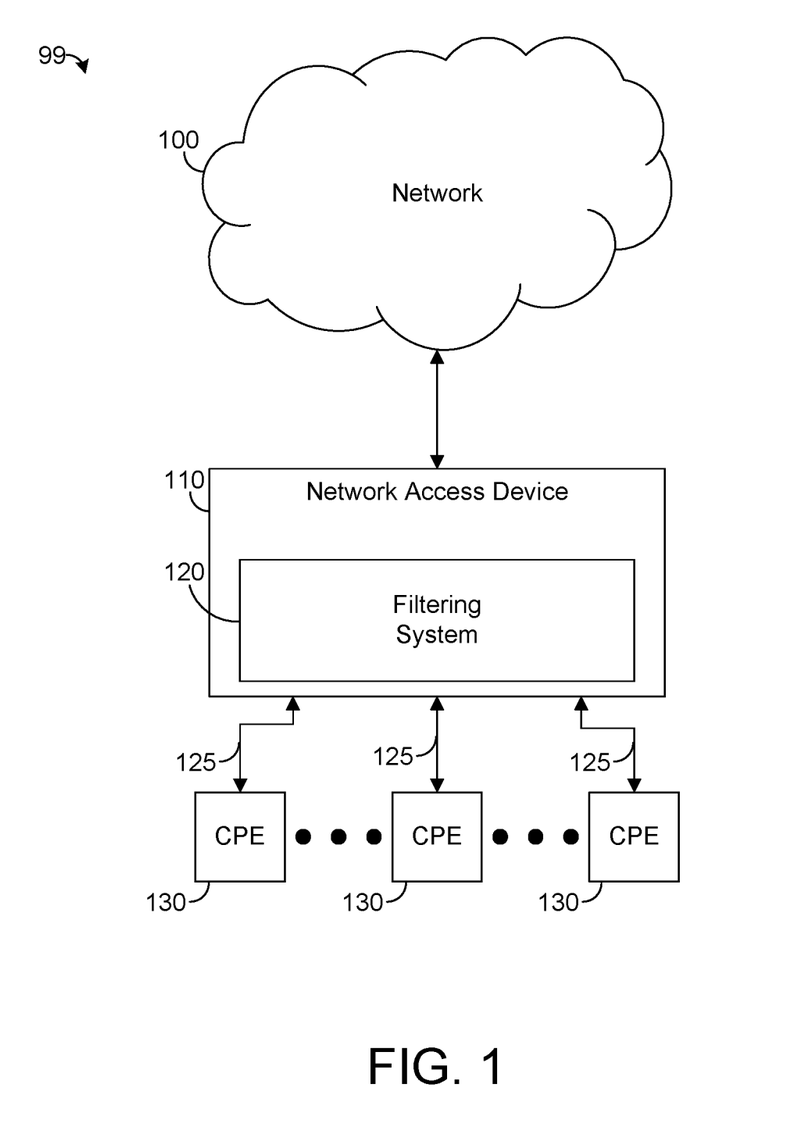
FIG. 1 is a block diagram illustrating an exemplary embodiment of a communication system.

FIG. 1 is a block diagram depicting an exemplary embodiment of a communication system 99 having at least one network 100 in communication with customer premises equipment (CPE) 130 at one or more customer premises that are remote from the network 100. The network 100 may comprise any known network, such as the public switched telephone network (PSTN), wide area network (WAN) (e.g., the Internet), local area network (LAN), cellular network, or any other type of network used for communication. The network access device (NAD) 110 may be implemented at the edge of the network 100 and connect the network 100 to one or more remote devices, such as CPE 130. As an example, the network access device 110 may be coupled to the CPE 130 by one or more subscriber lines 125, such as twisted-wire pairs or optical fibers. In some embodiments, the network access device 110 may communicate with CPE 130 or other communication equipment wirelessly.

As shown by FIG. 1, the NAD 110 comprises a filtering system 120 that filters traffic flowing through the NAD 110 to implement access control rules on the traffic. As an example, the filtering system 120 may drop certain packets based on their header information in an effort to limit traffic passing through the NAD 110. Thus, the filtering system 120 may effectively block needless or harmful traffic in the upstream or downstream directions thereby reducing the amount of traffic that passes through the NAD 110. In this regard, as will be described in more detail below, the filtering system 120 may store ACL tables defining access control lists that list access control actions to be taken in order to filter the packets received by the NAD 110. The header information in the received packets may be compared to these ACL tables to find actions to be taken in processing the received packets. As an example, some packets may be dropped. In another example, the header information of a received packet may be changed before it is allowed to egress from the NAD 110. Yet other actions are possible in other examples.

Figure 2:
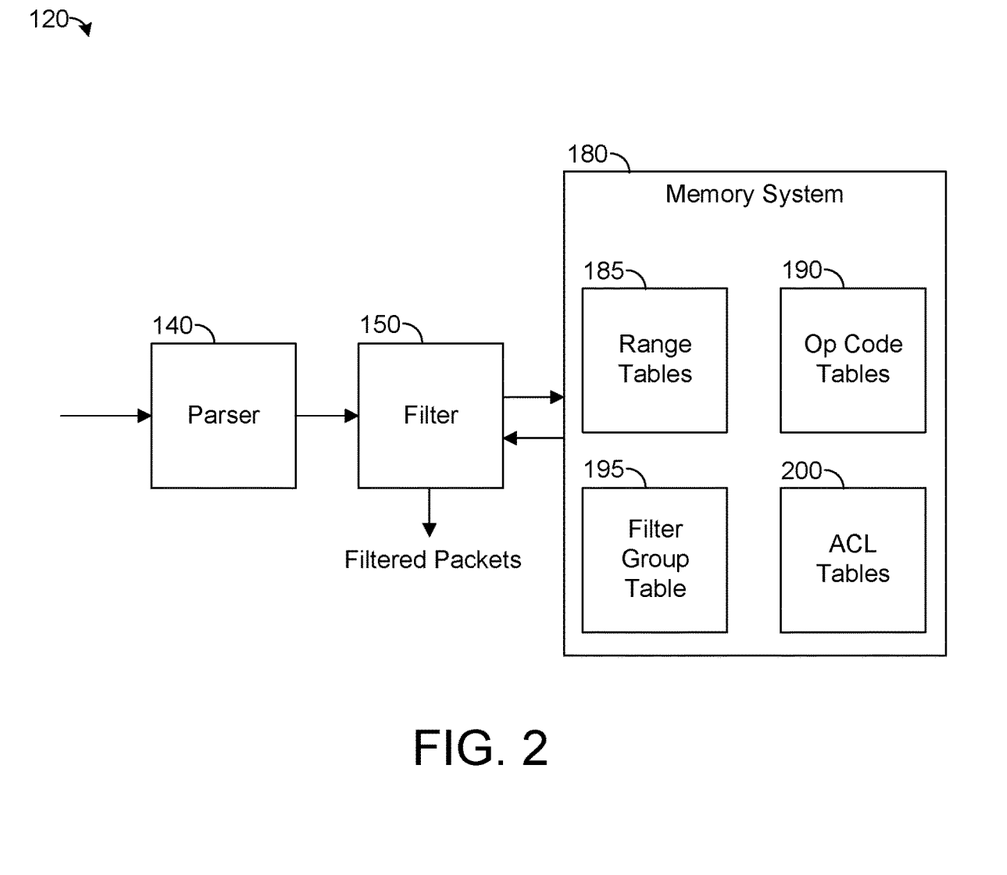
FIG. 2 is a block diagram illustrating an exemplary embodiment of a filtering system, such as is depicted by FIG. 1.

FIG. 2 is a block diagram illustrating an exemplary embodiment of a filtering system 120. The filtering system 120 may be implemented in a variety of different ways including by one or more FPGAs, ASICs, general CPUs executing software, or some combination thereof. In one embodiment, the filter system 120 includes a parser 140 for receiving a data packet (e.g., a downstream packet received from the network 100 or an upstream packet received from CPE 130) and parsing header fields from the received data packet. As known in the art, header fields may include destination/source fields (e.g., source port number, destination port number, MAC address, source IP address, destination IP address, etc.) and other types of fields typically used to route or otherwise communicate messages. The information in the header fields of a received packet may indicate the types of protocols used to encapsulate the packet, as well as specify information required by these protocols, and the header fields may be used to identify or distinguish the packet's flow from the flows of other packets that may be received by the NAD 110.

The filter 150 is configured to receive data packets passing through the NAD 110, including the header information parsed by the parser 140, and use the parsed header information to filter the packets based on access control lists stored in a memory system 180. Various types of memory and combinations of memory, such as random access memory (RAM) and/or content addressable memory (CAM), may be used to implement the memory system 180. As shown by FIG. 2, the memory system 180 stores a plurality of range tables 185, a plurality of op code tables 190, a filter group table 195, and a plurality of ACL tables 200. Note that each of the tables shown in the memory system 180 of FIG. 4 comprises data that is stored memory, and different types of memory may be used to store different tables. As an example, the data of one table may be stored in RAM, and the data of another table may be stored in CAM. As will be described in more detail hereafter, the data of the ACL tables 200 may be stored in RAM, and the search strings used to search and retrieve data from the ACL tables may be controlled to perform exact-match searching, the results of which may be used to reach a single prioritized match among the entire set of filter entries for the associated filter group.

Each ACL table 200 has a plurality of entries with each entry storing data, referred to herein as an "action-priority pair," that is associated with a data word, referred to herein as "entry key" used to identity when there is a "hit" or in other words a match with the entry and, thus, deliver the resulting action-priority pair stored in the entry. Each action-priority pair indicates at least one access control action to be performed for implementing a desired rule and a priority for that action. As an example, an access control action might be to change the header of or drop a packet that is deemed to match the entry. Any type of access control action may be indicated by an entry of an ACL table 200.

Each ACL table 200 is correlated with a respective op code table 190 that may be used to convert header information from a received packet to a search string that may be compared to the entry keys of the correlated ACL table 200. In some embodiments, each op code table 190 defines a bit mask that may be applied to the received header information to effectively remove "don't care" bits from the header information so that the resulting bit string may be compared to the key identifiers of the correlated ACL table 200 to identify entries that are a "hit" for the packet. As will be described in more detail below, an action indicated by a hit in the ACL table 200 (or in other words an action in an entry having an entry key that matches the search string generated from use of the correlated op code table 190) may be performed by the filter 150 in processing the received packet.

In some embodiments, the header information from header fields parsed by the parser 140 may be compressed before the bit masks defined by the op code tables 190 are applied to the header information. As an example, a header of x bits may be mapped to y bits of information where the value of y is less than the value of x. For example, the header of a received packet may include a version identifier that indicates the packet's Internet Protocol (IP) version. For filtering purposes, certain access control rules implemented by the filter 150 may only care about whether the protocol of the packet is in accordance with IP Version 4 (v4), IP Version 6 (v6), or neither v4 nor v6. In such an example, the IP version field may be converted to a 2 bit number indicating whether the packet is v4, v6, or neither. The resulting 2 bit number is effectively a range identifier that indicates whether the version number is in a certain range. In another example, the header information from a parsed packet may have an identifier identifying a particular port from which the packet was received by the network access device 110. However, certain access control rules implemented by the filter 150 may only care about whether the packet has been received by a certain range of ports. In such case, the port identifier for the packet may be mapped to a range identifier identifying a range of port identifiers. In such an example, the bit length of the range identifier may be less than the port identifier such that the port identifier is compressed when it is converted into a range identifier. Moreover, the range tables 185 preferably include data that may be used to compress header fields to smaller sets of information or identifiers, referred to as "range identifiers." That is, a given range table may be used to map one or more header fields to one or more range identifiers. As an example, to map a port identifier to a range identifier, as described above, a range table 185 for the port identifier may be created and modified to list the plurality of port identifiers that are associated with the same range identifier. A port identifier from a received packet matching one that is included in such range table 185 may be converted into the associated range identifier. Other types of range tables 185 may be similarly used to map other types of header fields to range identifiers.

Note that the behavior of the filter 150 is preferably different depending on the flow from which a packet is received. That is, it may be desirable for the filtering performed by the filter 150 to be dependent on the flow such that different flows are filtered differently by the filter 150. The filter group table 195 includes information for enabling the filter 150 to map a received packet to a set of range tables 185, op code tables 190, and ACL tables 200 associated with the packet's flow. In this regard, the filter 150 is configured to use header information from the received packet, such as one or more header fields (e.g., a source address and/or destination address), to look up an identifier, referred to herein as "filter group identifier," that is associated with the packet's flow and identifies a set of range tables 185, op code tables 190, and ACL tables to be used for filtering the flow. Different filter group identifiers identify different sets of tables and thus may be used to filter packets differently depending on their header information.

As an example, each range table 185 may be associated with a respective filter group identifier and include data mapping at least one header field of a received packet to at least one range identifier. For example, the filter logic 150 may use a header field as a key to look up the range identifier to be used to represent the value of that header field. Since different range tables 185 are associated with different filter group identifiers, the mapping performed for a given header field may be different depending on the filter group identifier used for the packet. Similarly, each filter group identifier may be associated with a different set of op code tables 190 and ACL tables 200 such that a different set of access control rules are used for one packet associated with one filter group identifier relative to another packet associated with a different filter group identifier. Note that, if the same set of access control rules are to be used for two different flows, then the packets of both flows may be mapped to the same filter group identifier so that the same set of range tables 185, op code tables 190, and ACL tables 200 are used for filtering packets from both flows.

Figure 3:
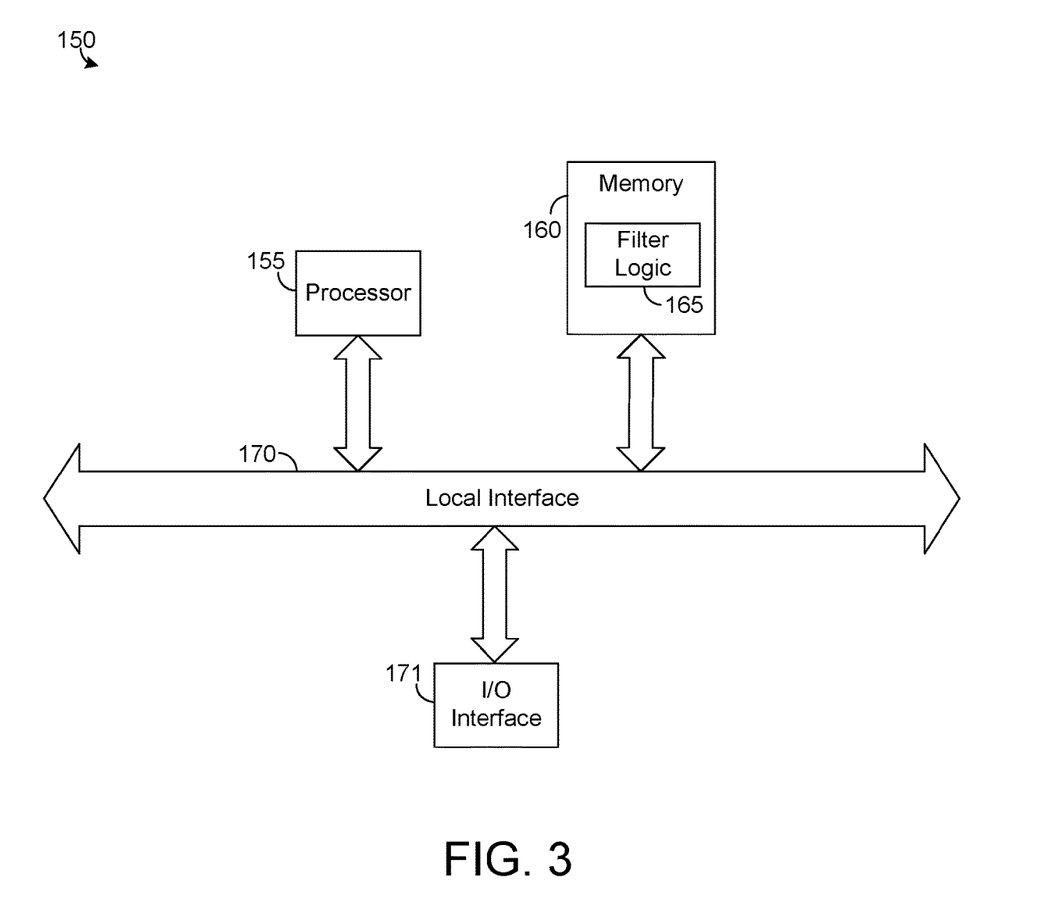
FIG. 3 is a block diagram illustrating an exemplary embodiment of a filter, such as is depicted by FIG. 2.

FIG. 3 is a block diagram illustrating an exemplary embodiment of a filter 150. The filter 150 may be embodied in one or more field programmable gate arrays (FPGAs), application-specific integrated circuits (ASICs), or general central processing units (CPUs) or digital signal processors (DSPs) executing software, or any combination thereof. In the exemplary embodiment depicted by FIG. 3, the filter 150 comprises at least one processor 155 that is configured to execute instructions defined by filter logic 165 stored in memory 160. The processor 155 communicates with the memory 160 through a local interface 170, which may include one or more data lines or serial buses. In some embodiments, filter logic 165 may be implemented in hardware using FPGAs or collections of physical structures on one or more ASICs (e.g., logic gates, wiring routes, shift registers, etc.). As shown by FIG. 3, the filter 150 may have an input/output interface 171 (e.g., pins or ports) for receiving and outputting information, such as data packets.

In implementing the filter 150, hardware resources may be shared with other components, such as the memory system 180. As an example, in one embodiment, the filter logic 165 may be stored in the memory system 180 along with the tables shown by FIG. 2, and the processor 155 may retrieve instructions from the memory system 180 and execute the instructions to perform the functions described herein for the filter 150.

Figure 4:
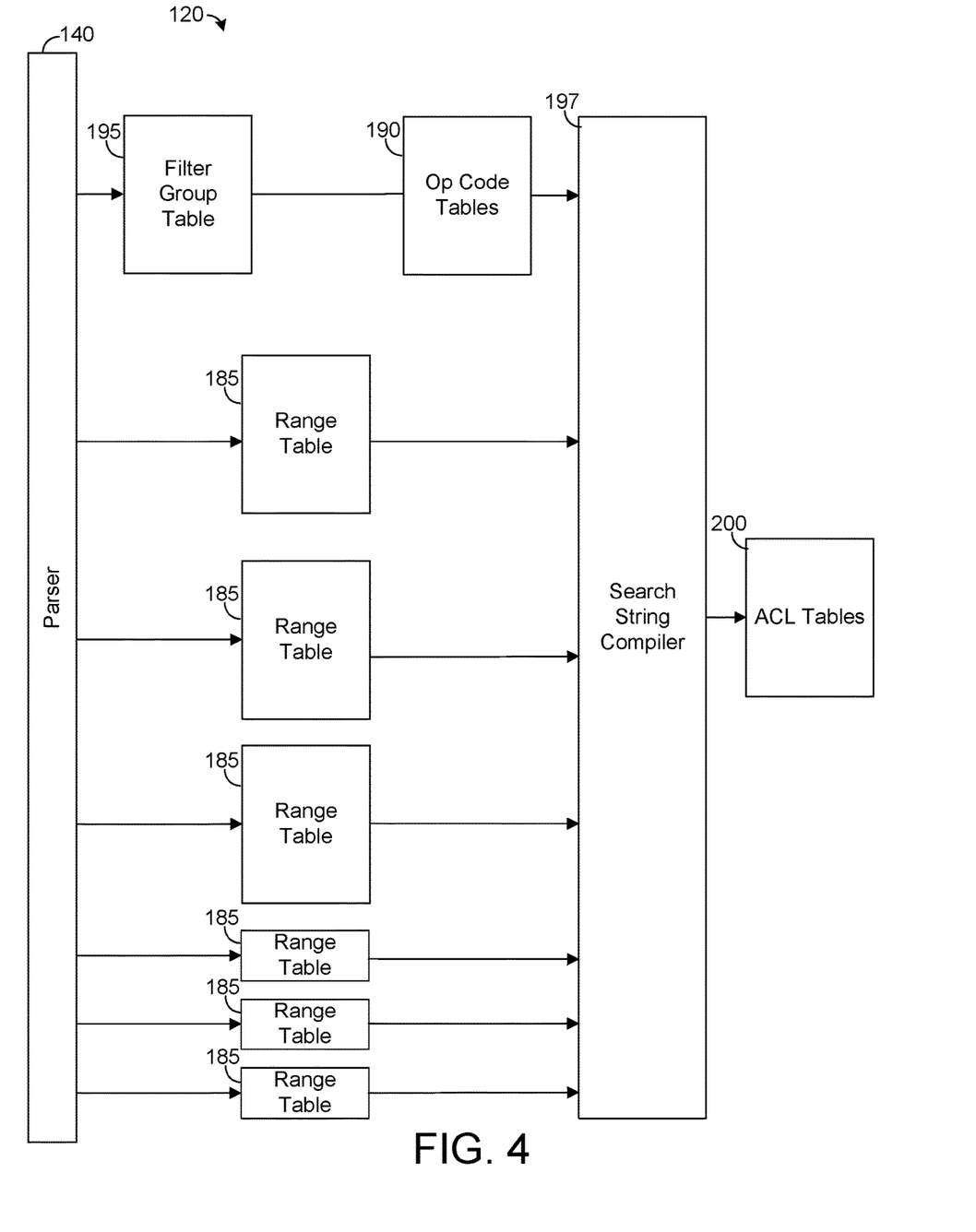
FIG. 4 is a diagram illustrating an exemplary processing flow for a filtering system, such as is depicted by FIG. 2.

FIG. 4 is a block diagram illustrating an exemplary processing flow diagram to facilitate an understanding of the filtering performed by the filtering system 120. The filter 150 receives a packet that is parsed by parser 140. Parser 140 separates the packet header into a variety of header fields. In a first stage of processing, the filter 150 is configured to use the filter group table 195 to map header information of the received packet (e.g., one or more header fields) to a filter group identifier. In a second stage of processing, the filter 150 is configured to use range tables 185 identified by the packet's filter group identifier to map header information from the packet into range identifiers. Such mapping may compress the header information such that the overall bit length of the range identifiers is smaller than the overall bit length of the header fields from the packet.

Note that some range tables 185 may provide multiple matches and may return the highest priority match (e.g., the longest match). Some range tables 185 may be reused on multiple header fields of a packet header. As an example, the same range table 185 may be searched twice, once on the packet's source port number and once on the packet's destination port number. Some range tables 185, such as a range table 185 for an IP address, may provide multiple matches for a particular input (e.g., a subnet level entry and a host level entry). In cases where more than one match is made from a range table 185, a priority determination may be made such that only one range identifier is issued per search (e.g., in the IP address example the longer hit may be returned (host level identifier)).

In a third stage of processing, the range identifiers from the associated range tables 185 are used to generate search strings to be used for searching the ACL tables 200 associated with the packet's filter group identifier. In this regard, the filter 150 is configured to use the filter group identifier to find op code tables 190 and ACL tables 200 associated with the packet's filter group identifier. As noted above, each such op code table 190 is correlated with a particular ACL table 200 that is to be used for filtering the packet. Each op code table 190 defines an op code that, when applied to the range identifiers, converts the range identifiers into a search string that may be used to search the correlated ACL table 200. In one embodiment, each op code table 190 defines a bit mask that effectively removes "don't care" bits from the range identifiers so that an exact match search may be performed on the correlated ACL table 200.

Thus, for the third stage of processing, the filter 150 defines a search string compiler 197, as shown by FIG. 4. For each ACL table 200 associated with the packet's filter group identifier, the search string compiler 197 may apply, to the range identifiers from the range tables 185, the bit mask defined by the op code table 190 that is correlated with the ACL table 200 to generate a search string to be used for searching the ACL table 200.

In a fourth stage of processing, the search strings generated from the op code tables 190 in the third stage of processing are used to perform exact match searching on the ACL tables 200. In this regard, for a search string from application of a given op code table 190 to the range identifiers, the filter 150 is configured to compare the search string with entry keys of the ACL table 200 correlated with the op code table 190. Each entry for which there is a match is identified as a "hit." In some cases, there may be no hits, a single hit, or multiple hits per table 200. As noted above, each entry of an ACL table 200 has an action-priority pair. If there are multiple hits in this fourth stage of processing, then the filter 150 compares the priority indicators of the ACL table hits to identify the highest priority hit. The filter 150 then performs the access control action indicated by this highest priority hit. If there is only one ACL table hit, then the filter 150 performs the access control action indicated by this single hit. If there are no ACL table hits, then the filter 150 may perform a default access control action, as may be desired.

Note that a variety of modifications and changes to the embodiments described are possible. As an example, in some embodiments, compressing the header fields may be performed at the same time or in parallel with the determining the filter group identifier. While this may be faster, it introduces potential rule overlap and collision issues since different range identifiers may be significant to different filter group table sets. To compensate for these issues, additional range identifiers can be inserted into the range tables 185 to cover the overlapping and colliding areas.

As noted above, some flows may be grouped into the same filter group by using the same group filter identifier for multiple flows. In some cases, flows that are to have similar but slightly different access control rules may be grouped with the same filter group identifier and additional range tables 185 may be introduced to distinguish between filter group members. Using this approach, additional entries in the ACL tables 200 may be added to accommodate the additional rules needed for the rule differences between flows associated with the same filtering group identifier.

Figure 5:
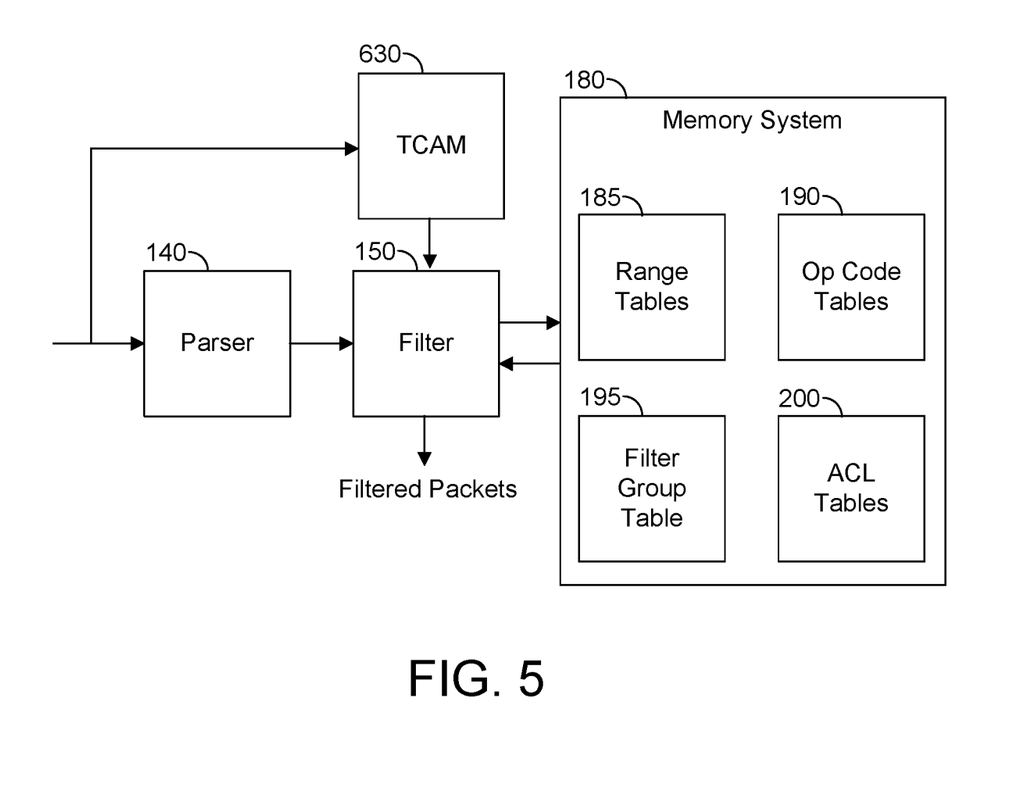
FIG. 5 is a block diagram illustrating an exemplary embodiment of a filtering system, such as is depicted by FIG. 1.

In some embodiments, a TCAM may be used to provide a greater number of entries to be accommodated relative to the total number of entries that can be provided by the memory resources used for the tables described herein. FIG. 5 depicts such an embodiment where a TCAM 630 runs in parallel to the filter 150 described above. In such case, at least some action-priority pairs may be stored in the TCAM 630, thereby reducing the total number of action-priority pairs that need to be stored in the memory system 180. Using conventional techniques, the TCAM 630 is configured to determine when the header information from a received packet matches action-priority pairs stored in the TCAM 630 and, if so, to provide such action-priority pairs to the filter 150, which may then perform priority resolution, as described above, to select an access control action to perform among the hits from the TCAM 630 and the filter 150. In such an embodiment, a smaller and less complex TCAM 630 may be used relative to one that is capable of handling all of the rules implemented by the action-priority pairs. In such case, the combination of the filter 150 and the smaller TCAM 630 may be less expensive than a solution that uses a conventional TCAM to accommodate all of access control rules.

Figure 6:
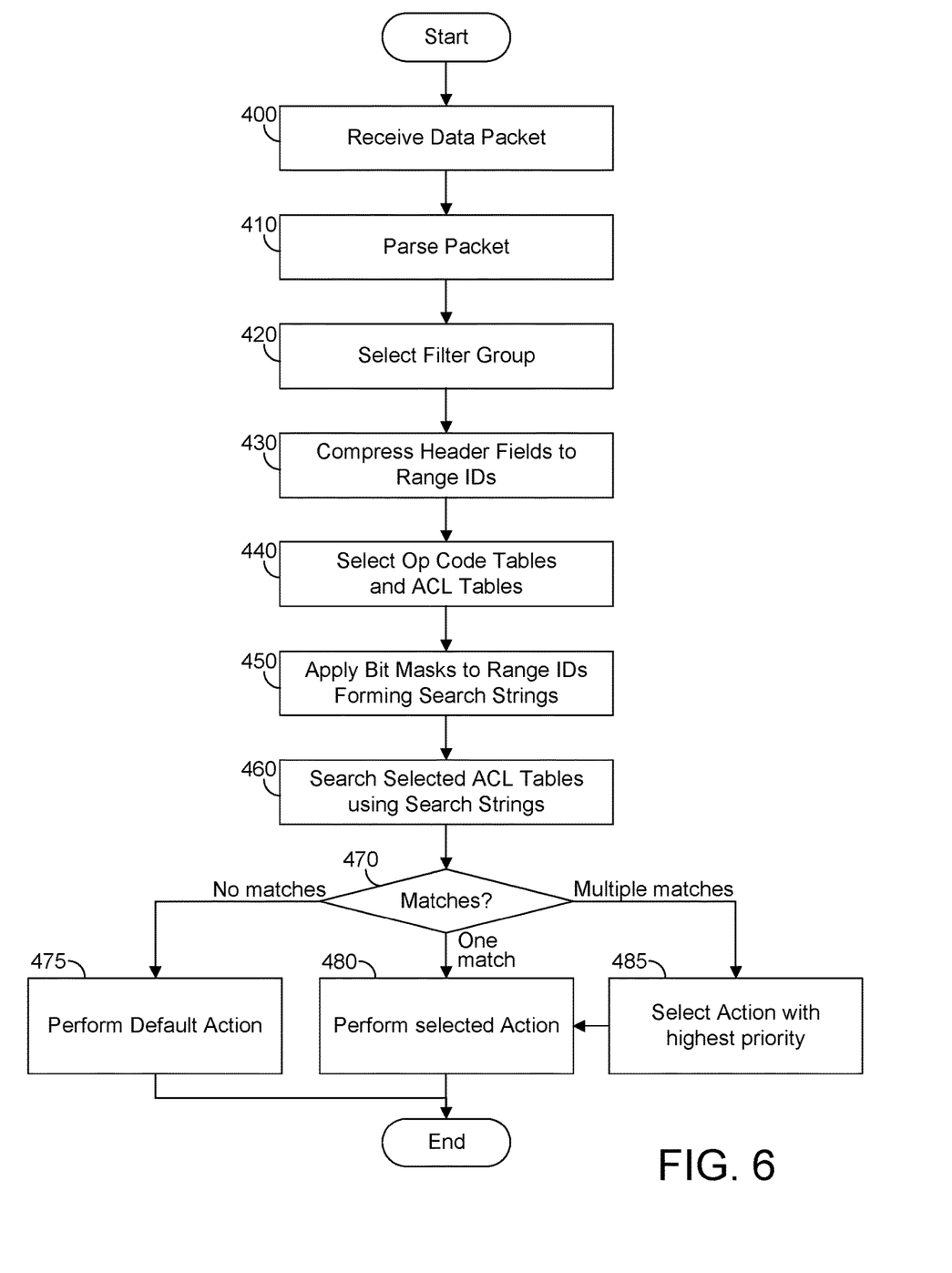
FIG. 6 is a flowchart illustrating an exemplary process processing packets by a filtering system, such as is depicted by FIG. 2.

FIG. 6 is a flow chart depicting an exemplary process that may be implemented by the filter system 120 for a packet received by the network access device 110 from the network 100 or from CPE 130. At step 400, the filtering system 120 receives a packet. At step 410, the parser 140 parses packet thereby providing a set of header fields. At step 420, the filter 150 determines a filter group identifier for the packet based on the header fields. At step 430, the filter 150 compresses header fields to range identifiers using range tables 185 associated with the filter group identifier. In this regard, each header field used by the filter 150 is processed to reduce the various values in each field to a smaller range identifier (represented by fewer bits) significant for that particular header for filtering purposes.

At step 440, the filter 150 selects op code tables 190 and ACL tables 200 associated with the identified filter group. As noted above, these selected op code tables 190 and ACL tables are to be used for further processing of the received packet. In this regard, at step 450, the filter 150 applies op codes from the selected op code tables 190 to provide a plurality of search strings. In this regard, as described above, the filter 150 applies the op code from a given op code table 190 to the range identifiers to define a search string that is to be used to search the ACL table 200 that is correlated with the op code table 190. In some embodiments, the op code table 190 defines a bit mask that removes at least some bits of the range identifiers.

At step 460, the filter 150 performs a sequence of exact match searches of all the selected ACL tables 200 using their corresponding search strings. In this regard, for each search string provided by a given op code table 190, the filter 150 is configured to use the search string to search for matching entries of the ACL table 200 that is correlated with such op code table 190. As noted above, there may be no hits, one hit, or multiple hits from the search.

At step 470, the filter 150 determines the number of matches or hits generated by the searching at step 460. If no matches are found, the filter 150 performs a default access control action at step 475. If a single match is found, the filter 150 selects the action-priority pair of the matching entry and performs the access control action indicated by such action-priority pair at step 480. If multiple matches are found, the filter 150 determines which matching entry has the highest priority based on the priority indicated by its matching action-priority pair. The filter 150 then selects the action-priority pair with the highest priority and performs the access control action indicated by such action-priority pair at step 485.

The filtering techniques have been described above in the context of providing access control to network traffic. Note that it is possible to provide similar access control list filtering between other types of resources. As an example, this filtering may be performed on traffic to a computer resource to protect the computer resource from malicious traffic, such as traffic from denial of service attacks. The filtering may be used in other contexts in other examples.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. For instance, the order of particular steps or the form of particular processes can be changed in some cases to perform equivalent steps. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

Now, therefore, the following is claimed:

1. A system for controlling access to a network using access control list (ACL) filtering, comprising:
   a memory system for storing ACL tables, each of the ACL tables storing a plurality of action-priority pairs, each of the action-priority pairs indicative of an access control action and a priority associated with the access control action, wherein each of the ACL tables is correlated with a respective bit mask; and
   a filter configured to receive and filter a flow of data packets, the flow including a data packet having a plurality of header fields,
   the filter configured to determine a filter group identifier based on at least one field of the plurality of header fields,
   the filter configured to select a plurality of the ACL tables associated with the filter group identifier for use in processing the data packet, the filter configured to compress the plurality of header fields into a set of range identifiers and to apply a plurality of bit masks respectively correlated with the selected plurality of ACL tables to the range identifiers thereby generating a plurality of search strings, wherein each search string is for searching a respective one of the selected plurality of ACL tables, the filter configured to perform exact-match searches on the selected plurality of ACL tables with the plurality of search strings, the filter further configured to select an action-priority pair from the selected plurality of ACL tables matching a respective one of the plurality of search strings and perform the access control action indicated by the selected action-priority pair, wherein the access control action controls whether the data packet is dropped by the filter or whether header information in the data packet is changed by the filter.

2. The system for controlling access to the network of claim 1, wherein the filter is further configured to perform comparisons of priorities indicated by action-priority pairs from the selected plurality of ACL tables matching the plurality of search strings.

3. The system for controlling access to the network of claim 2, further comprising a ternary content-addressable memory (TCAM) configured to receive the plurality of header fields and to provide at least one action-priority pair in response to the plurality of header fields, wherein the filter is configured to compare at least one priority indicated by the at least one action-priority pair to the priorities indicated by the action-priority pairs from the selected plurality of ACL tables matching the plurality of search strings.

4. The system of claim 1, wherein the access control action is to drop the data packet from the flow.

5. A system for controlling access to a resource using access control list (ACL) filtering, comprising:
a memory system for storing access control list (ACL) tables for a plurality of filter groups, each of the ACL tables having a plurality of action-priority pairs, wherein each of the action-priority pairs indicates a priority and an access control action for processing data packets; and
a filter configured to receive and filter a flow of data packets, the flow including a data packet having a plurality of header fields,
the filter configured to use at least one of the plurality of header fields to determine a filter group identifier,
the filter configured to compress the plurality of header fields into a set of range identifiers,
the filter configured to select a subset of the ACL tables based upon the group identifier,
the filter configured to convert the set of range identifiers into a plurality of search strings for searching the subset of the ACL tables,
the filter configured to search the subset of the ACL tables using the plurality of search strings,
the filter configured to select an action-priority pair from the subset of the ACL tables matching a respective one of the plurality of search strings,
the filter configured to perform an access control action indicated by the selected action-priority pair, wherein the access control action controls whether the data packet is dropped by the filter or whether header information in the data packet is changed by the filter.

6. The system for controlling access to the resource of claim 5, wherein the filter is further configured to perform comparisons of priorities indicated by action-priority pairs from the subset of the ACL tables matching the plurality of search strings.

7. The system of claim 5, wherein the access control action is to drop the data packet from the flow.

8. A method for controlling access to a network using access control list (ACL) filtering, comprising:
storing ACL tables in a memory system, each of the ACL tables storing a plurality of action-priority pairs, each of the action-priority pairs indicative of an access control action and a priority associated with the access control action;
correlating each of the ACL tables with a respective bit mask;
receiving, with a filter, a flow of data packets, the flow including a data packet having a plurality of header fields;
filtering, with the filter based on information in header fields of the data packets, the flow of the data packets;
determining, with the filter, a filter group identifier based on at least one of the plurality of header fields;
selecting, with the filter, a subset of the ACL tables associated with the filter group identifier for use in processing the data packet;
compressing, with the filter, the plurality of header fields into a set of range identifiers;
applying, with the filter, a plurality of bit masks respectively correlated with the subset of ACL tables to the range identifiers, thereby generating a plurality of search strings;
performing, with the filter, exact-match searches on the subset of ACL tables with the plurality of search strings;
selecting, with the filter, an action-priority pair from the subset of ACL tables matching a respective one of the plurality of search strings; and
performing the access control action indicated by the selected action-priority pair, wherein the access control action controls whether the data packet is dropped by the filter or whether header information in the data packet is changed by the filter.

9. The method of claim 8, further comprising performing, with the filter, comparisons of priorities indicated by action-priority pairs from the subset of ACL tables matching the plurality of search strings.

10. The method of claim 9, further comprising:
receiving the plurality of header fields at a ternary content-addressable memory (TCAM); providing at least one action-priority pair with the TCAM in response to the plurality of header fields; and
comparing, with the filter, at least one priority indicated by the at least one action-priority pair to the priorities indicated by the action-priority pairs from the subset of ACL tables matching the plurality of search strings.

11. The method of claim 8, wherein the access control action is to drop the data packet from the flow.

* * * * *